US012806521B2

(12) United States Patent
Li

(10) Patent No.: US 12,806,521 B2
(45) Date of Patent: Nov. 24, 2026

(54) DISPLAY CONTROL FOR SKILL INDICATOR ALIGNMENT IN VIRTUAL SCENES

(71) Applicant: NETEASE (HANGZHOU) NETWORK CO., LTD., Hangzhou (CN)

(72) Inventor: Weinan Li, Hangzhou (CN)

(73) Assignee: NETEASE (HANGZHOU) NETWORK CO., LTD., Hangzhou (CN)

( * ) Notice: Subject to any disclaimer, the term of this patent is extended or adjusted under 35 U.S.C. 154(b) by 129 days.

(21) Appl. No.: 18/877,304

(22) PCT Filed: Mar. 6, 2023

(86) PCT No.: PCT/CN2023/079862
§ 371 (c)(1),
(2) Date: Dec. 20, 2024

(87) PCT Pub. No.: WO2023/246172
PCT Pub. Date: Dec. 28, 2023

(65) Prior Publication Data

US 2026/0273402 A1 Sep. 17, 2026

(30) Foreign Application Priority Data

Jun. 21, 2022 (CN) ......................... 202210708737.3

(51) Int. Cl.
*A63F 13/537* (2014.01)
*A63F 13/42* (2014.01)
*A63F 13/5252* (2014.01)
*G06F 3/0486* (2013.01)
*G06F 3/0488* (2022.01)

(52) U.S. Cl.
CPC ............ *A63F 13/537* (2014.09); *A63F 13/42* (2014.09); *A63F 13/5252* (2014.09); *G06F 3/0486* (2013.01); *G06F 3/0488* (2013.01)

(58) Field of Classification Search
CPC .... A63F 13/537; A63F 13/42; A63F 13/5252; G06F 3/0486; G06F 3/0488
(Continued)

(56) References Cited

U.S. PATENT DOCUMENTS 11,890,541 B2 * 2/2024 Hu ........................ A63F 13/426
2004/0157662 A1 * 8/2004 Tsuchiya ............ A63F 13/5378 463/32
(Continued)

FOREIGN PATENT DOCUMENTS

CN 108744527 A * 11/2018 ............ A63F 13/55
CN 111530075 A 8/2020
(Continued)

OTHER PUBLICATIONS

China National Intellectual Property Administration, International Search Report for PCT Application No. PCT/CN2023/079862, dated Jun. 15, 2023.

*Primary Examiner* — Michael A Cuff
(74) *Attorney, Agent, or Firm* — Patterson + Sheridan, LLP

(57) ABSTRACT

The present disclosure provides a display control method and apparatus for a skill indicator. The method includes: in response to a touch operation for a skill control, acquiring a touch position of the skill control, where the touch position is located in a first direction relative to a specified position; on a plane of a scene picture, determining an object position of a controlled virtual object; generating a reference line segment in the first direction relative to the object position, where the reference line segment reaches a farthest release position of a target skill in the virtual scene; determining a target position in the reference line segment according to the touch position; determining a target mapping position in the virtual scene using the target position; and controlling, at the
(Continued)

target mapping position, a display of the skill indicator for the target skill.

20 Claims, 4 Drawing Sheets

(58) Field of Classification Search
USPC .............................................................. 463/31
See application file for complete search history.

(56) References Cited

U.S. PATENT DOCUMENTS

2007/0270215 A1* 11/2007 Miyamoto .............. A63F 13/45 463/32
2009/0181736 A1* 7/2009 Haigh-Hutchinson ...................... A63F 13/55 463/2
2016/0129345 A1* 5/2016 Seok ..................... A63F 13/213 463/31
2018/0147488 A1* 5/2018 Tang ................... A63F 13/2145
2018/0339229 A1* 11/2018 He ...................... G06F 3/04847
2022/0080316 A1* 3/2022 Huang .................... A63F 13/56
2024/0091645 A1* 3/2024 Hu ........................ A63F 13/537

FOREIGN PATENT DOCUMENTS

CN 111773720 A * 10/2020 ........... A63F 13/803
CN 111840987 A 10/2020
CN 113559495 A 10/2021
CN 113694511 A 11/2021
CN 114296597 A * 4/2022
WO 2023246172 A1 12/2023

* cited by examiner

DISPLAY CONTROL FOR SKILL INDICATOR ALIGNMENT IN VIRTUAL SCENES

CROSS-REFERENCE TO RELATED APPLICATIONS

The present disclosure is a 371 national phase application of PCT Application No. PCT/CN2023/079862 filed Mar. 6, 2023, which claims priority to Chinese Patent Application No. 202210708737.3 entitled "DISPLAY CONTROL METHOD AND APPARATUS FOR SKILL INDICATOR, AND ELECTRONIC DEVICE" filed on Jun. 21, 2022, the entire contents of both of which applications are hereby incorporated by reference for all purposes.

TECHNICAL FIELD

The present disclosure relates to the technical field of games, and particularly relates to a display control method and apparatus for a skill indicator, and an electronic device.

BACKGROUND

In mobile games with 3D angles of view, players can adjust the position and angle of a virtual camera to shoot a virtual scene, so as to get scene pictures from different angles of view. When the player observes the virtual scene through the scene pictures, the virtual scene has a perspective effect. On the basis of that, when the player releases a skill in the virtual scene, the player can drag a skill control in a certain direction, and then a corresponding skill indicator will be displayed in the virtual scene. Due to the influence of the perspective effect, the display position of the skill indicator in the virtual space usually does not match the position where the player drags the skill control on a two-dimensional plane, making the player having a feeling that the skill control does not follow the player's operation intention, which makes it difficult for the player to accurately control the release position of the skill, reduces the interaction experience of the game, prolongs the running time of a terminal device, and causes high electric quantity consumption of the terminal device.

SUMMARY

In view of this, an objective of the present disclosure is to provide a display control method and apparatus for a skill indicator, and an electronic device to improve the responsiveness when the player touches a skill control, such that the player can accurately control the release position of a skill, thereby improving the interaction experience of the game, reducing the running time of a terminal device, and saving on the electric quantity of the terminal device.

According to a first aspect, the present disclosure provides a display control method for a skill indicator. The method includes: in response to a touch operation for a skill control, acquiring a touch position of the skill control, where a graphical user interface is provided by a terminal device, the graphical user interface displays the skill control and a scene picture that is shot by a virtual camera in a virtual scene, the skill control is displayed at a specified position on the graphical user interface and is configured to release a target skill, the virtual scene comprises a controlled virtual object that is controlled through the terminal device, and the touch position is located in a first direction relative to the specified position; on a plane of the scene picture, determining an object position of the controlled virtual object; generating a reference line segment in the first direction relative to the object position, where the reference line segment reaches a farthest release position of the target skill in the virtual scene; determining a target position in the reference line segment according to the touch position; determining a target mapping position in the virtual scene using the target position; and controlling, at the target mapping position, a display of a skill indicator for the target skill.

According to a second aspect, the present disclosure provides a system, comprising one or more memories collectively containing one or more programs, and one or more processors, where the one or more processors are configured to, individually or collectively, perform the operations in the above display control method for a skill indicator.

According to a third aspect, the present disclosure provides one or more non-transitory computer-readable storage media containing, in any combination, computer program code that, when executed by a computer system, performs the operations in the above display control method for a skill indicator.

DETAILED DESCRIPTION

Figure 1:
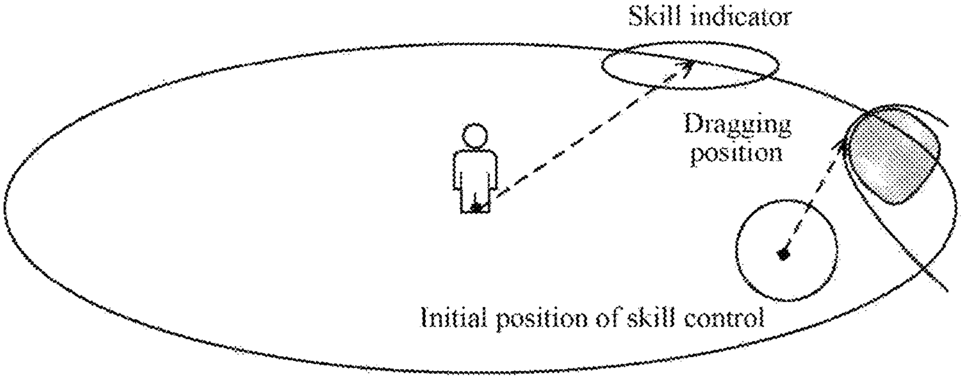
FIG. 1 is a schematic diagram of a skill indicator and a skill control dragging position provided by one of embodiments of the present disclosure.

In the above-mentioned display control method and apparatus for a skill indicator, in response to a touch operation for the skill control, the current touch position of the skill control is acquired, where the current touch position is located in a first direction relative to a specified position; on the plane of the scene picture, the object position of the controlled virtual object is determined, and a reference line segment is generated in the first direction relative to the object position, where the reference line segment reaches the farthest release position of the target skill in the virtual scene; the target position is determined in the reference line segment according to the current touch position, which is then mapped into the virtual scene to establish a target mapping position for displaying the skill indicator. In the disclosed methods, on the plane of the scene picture, the reference line segment with the same direction as the current touch position is generated; the target position is determined in the reference line segment based on the current touch position, and then the target position is mapped to the virtual scene to obtain the display position of the skill indicator. Because the reference line segment is in the same direction as the current touch position of the skill control, and the reference line segment reaches the farthest release position of the target skill, the display direction of the skill indicator can be the same as the touch position direction of the skill control. Consequently, the movement position of the skill indicator matches the touch position of the skill control. Therefore, the responsiveness when the player touches the skill control can be improved, such that the player can accurately control the release position of the skill, thereby improving the interaction experience of the game, reducing the running time of the terminal device, and saving on the electric quantity of the terminal device.

Further, the disclosed methods remain effective when the angle of view of a virtual camera is not fixed, or the angle of view of the virtual camera can be freely adjusted. The display direction of the skill indicator can still be the same as the touch position direction of the skill control on the scene picture corresponding to the current orientation of the virtual camera, and the movement position of the skill indicator is matched with the touch position of the skill control. Therefore, the display control method for a skill indicator provided in the present disclosure supports a wide application scene and can be applied to game scenes under various angles of view.

For the purpose of making objectives, technical schemes and advantages of the present disclosure more clear, clear and complete description will be made to the technical solutions of the present disclosure in cooperation with accompanying drawings. Definitely, the described embodiments are merely a part of the embodiments of the present discourse and not all the embodiments. Based on the embodiments of the present disclosure, all other embodiments obtained by those skilled in the art without creative work fall within the protection scope of the present disclosure.

Terms used in the present disclosure are merely for describing specific examples and are not intended to limit the present disclosure. The singular forms “one”, “the”, and “this” used in the present disclosure and the appended claims are also intended to include a multiple form, unless other meanings are clearly represented in the context. It should also be understood that the term “and/or” used in the present disclosure refers to any or all of possible combinations including one or more associated listed items.

Reference throughout this specification to “one embodiment,” “an embodiment,” “an example,” “some embodiments,” “some examples,” or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms “first”, “second”, “third”, and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term “if” used herein may be explained as “when” or “while”, or “in response to . . . , it is determined that”.

The terms “module,” “sub-module,” “circuit,” “sub-circuit,” “circuitry,” “sub-circuitry,” “unit,” or “sub-unit” may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components that are directly or indirectly linked together, so as to perform a particular function.

In mobile games with 3D angles of view, such as MMORPG (Massive Multiplayer Online Role-Playing Game), a player sometimes needs to release non-directive skills. The non-directive skills require the player to preselect a release position in a virtual scene, usually using a “drag” gesture to implement such operation, that is, the player presses a skill control and drags the skill control outwards, and then a skill indicator will be displayed in the virtual scene of the game to indicate the release position for the skill in the virtual scene after the skill control is released at the current position. However, due to the perspective effect of the virtual scene in the mobile game with 3D angle of view, the direction to which the player drags the skill control is not parallel to a movement direction of the skill indicator relative to the virtual object on a screen plane, which makes the player having a feeling that the skill control does not follow the player’s operation intention. For facilitating understanding, FIG. 1 is taken as an example, when the player drags the skill control, a straight line formed by the dragging position and an initial position of the skill control is not parallel to a straight line formed by the skill indicator and a virtual object, that is, a dragging direction of the skill control is not parallel to the movement direction of the skill indicator, which will make the player feel that the indicator is not controlled by the drag operation for the control.

Figure 2:
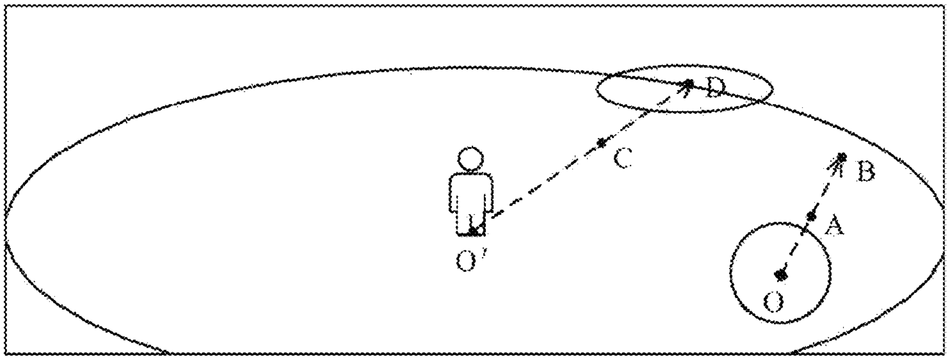
FIG. 2 is another schematic diagram of a skill indicator and a skill control dragging position provided by one of embodiments of the present disclosure.

In addition, the perspective effect will make objects in the virtual scene look small in the distance and big on the contrary, and the finger dragging distance is not proportional to the distance that the control indicator moves on the screen plane. For facilitating understanding, FIG. 2 is taken as an example, a point O is the initial position of the skill control, a point B is the farthest dragging position of the skill control, and a point A is the midpoint of a line segment formed by the point O and the point B; a point O' is the position of the virtual object, a point D is the position of the skill indicator when the skill control is dragged to the point B, and a point C is the position of the skill indicator when the skill control is dragged to the point A, but the point C is not located at the midpoint of a line segment formed by the O' point and the D point, but is closer to the D point, that is, the relationship between the length ratio of the line segment is O'C:CD>OA:AB. The inconsistency in distance ratios makes it difficult for the player to precisely control the release position.

Further, for the games with 3D angles of view, the player can adjust the position and angle of a virtual camera to shoot a virtual scene, so as to obtain scene pictures from different angles of view. The mapping relationship between the scene pictures from different angles of view and the virtual scene is different, so it is difficult to adjust the display position of the skill indicator through a fixed mapping relationship, such as a correction formula that reflects the mapping relationship.

Based on the above, embodiments provide a display control method and apparatus for a skill indicator, and an electronic device; and the technologies can be applied to a game with a 3D angle of view and an adjustable angle of view.

The display control method for a skill indicator according to one embodiment of the present disclosure can be operated on a local terminal device or a server. When the display control method for a skill indicator is operated on the server, the method can be realized and executed based on a cloud interaction system, and the cloud interaction system includes the server and a client device.

In some embodiments, various cloud applications can be operated in the cloud interaction system, such as: cloud games. Taking the cloud games as an example, the cloud games refer to a game mode based on cloud computing. Under the operation mode of the cloud games, an operation subject of a game program and a game picture presentation subject are separated, the storage and operation of the display control method for a skill indicator are implemented in a cloud game server, and the client device is configured to receive and send data and present game pictures, for example, the client device can be a display device which is close to a user and has a data transmission function, such as a mobile terminal, a television, a computer and a pocket computer; however, information processing is performed by the cloud game server at the cloud end. When a game is played, a player operates the client device to send an operation instruction to the cloud game server, then the cloud game server operates the game according to the operation instruction, data such as the game pictures are encoded and compressed and returned to the client device through a network, and finally the game pictures are decoded and outputted through the client device.

In some embodiments, taking a game as an example, the local terminal device stores the game program and is configured to present the game picture. The local terminal device interacts with the player through a graphical user interface, namely, the game program is downloaded, installed and operated through an electronic device conventionally. The local terminal device provides the graphical user interface for the player in various modes, for example, it can be rendered and displayed on a display screen of a terminal, or it is provided for the player through holographic projection. For example, the local terminal device may include the display screen and a processor, the display screen presents the graphical user interface, the graphical user interface includes the game picture, and the processor operates the game, generates the graphical user interface and controls the display of the graphical user interface on the display screen.

In a possible embodiment, an embodiment of the present disclosure provides a display control for a skill indicator; a graphical user interface is provided by a terminal device, and the terminal device can be the abovementioned local terminal device, or the abovementioned client device in the cloud interaction system.

Figure 3:
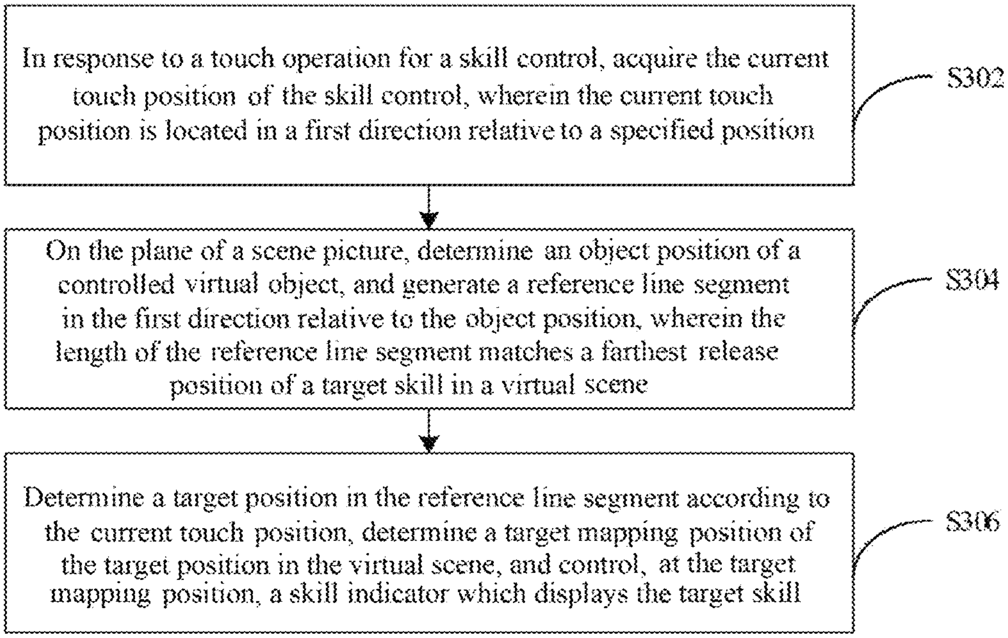
FIG. 3 is a flowchart of a display control method of a skill indicator provided by one of embodiments of the present disclosure.

In order to facilitate the understanding of the embodiment, the display control method for a skill indicator disclosed by the embodiment of the present disclosure will be described in detail; as shown in FIG. 3, the display control method for a skill indicator is that the graphical user interface is provided by the terminal device; the graphical user interface displays a skill control and a scene picture that is shot by a virtual camera in a game in a virtual scene; the skill control is displayed at a specified position on the graphical user interface and is configured to release a target skill; the specified position can be understood as a position in which the skill control is located and is not touched or dragged. The virtual scene includes a controlled virtual object that is controlled by the terminal device; the virtual scene is usually a scene in three-dimensional space, in which the virtual camera shoots the virtual scene and gets the scene picture. When the player changes the position and orientation of the virtual camera, the vision of the scene picture will also change. The controlled virtual object can be understood as the virtual object controlled by a current terminal device. The display control method for a skill indicator includes the following steps:

Step S302: In response to a touch operation for the skill control, acquire the current touch position of the skill control, where the current touch position is located in a first direction relative to a specified position.

The skill control is configured to release the target skill, and a touch operation can be performed on the skill control to adjust parameters such as the release direction and the release distance of the target skill. It is to be noted that after the touch operation is performed, the target skill is not released immediately, and only after specific release operation is performed, the target skill is released. The touch operation can be implemented in multiple modes, for example, dragging operation, that is, after the skill control is pressed, a sliding operation will be performed in a press state, and then the dragging operation can be achieved; for another example, a double-click operation is performed on the skill control, then a single-click operation is performed at other positions, and the skill control moves to a position in which the single-click operation is performed. In the process of performing the touch operation on the skill control, the touch position of the skill control changes along with the position of a touch point of the touch operation. In the virtual scene, the position of the skill indicator in the virtual scene changes along with the touch position of the skill control, so that a player can determine the release position of the target skill.

After the touch operation is performed on the skill control, the current touch position of the skill control can be acquired in real time; in an actual implementation, a two-dimensional coordinate system can be established in the graphical user interface, and coordinate information of the current touch position is collected based on the two-dimensional coordinate system. Generally, the current touch position of the skill control can be located in all directions of the specified position of the skill control, and can also be a certain distance away from the specified position. In an actual implementation, a reference direction can be set, it can be the vertical direction or horizontal direction, and can also be a direction indicated by an X axis or an Y axis of the two-dimensional coordinate system; and after the current touch position is acquired, the first direction of the current touch position relative to the specified position can be computed based on the current touch position and the specified position, the first direction can be specifically represented by an angle, and the angle can be an angle between a straight line formed by the specified position and the current touch position and a straight line in the reference direction.

Figure 4:
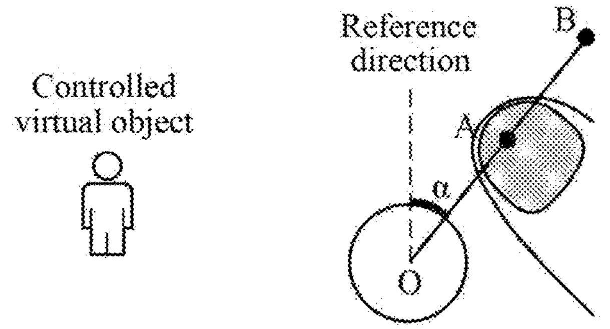
FIG. 4 is a schematic diagram of a skill control dragging direction and a datum direction provided by one of embodiments of the present disclosure.

In a specific embodiment, as shown in FIG. 4, the reference direction is the vertical direction, the point O represents the specified position of the skill control, the point A represents the current touch position, and the point B represents the maximum touch position of the skill control in the first direction to which the point A is located. At the moment, the angle between the straight line in the first direction and the straight line in the vertical direction is a. The angle can be computed in the clockwise direction, and the value range of the angle is 0-360 degrees at the moment.

Step S304: On the plane of the scene picture, determine an object position of the controlled virtual object, and generate a reference line segment in the first direction relative to the object position, where the length of the reference line segment matches a farthest release position of the target skill in the virtual scene.

The controlled virtual object usually has position coordinates in the three-dimensional space of the virtual scene; a mapping relationship between the three-dimensional coordinate system of the virtual scene and the two-dimensional coordinate system of the scene picture can be obtained through shooting parameters of the virtual camera; and after the coordinate system of the controlled virtual object in the virtual scene is acquired, the object position of the controlled virtual object in the scene picture can be computed through the mapping relationship. Because an area where a three-dimensional model of the controlled virtual object in the virtual scene is mapped in the scene picture is a display area, in order to determine the object position of the controlled virtual object, an observation point can be selected from the controlled virtual object, the position of the observation point in the scene picture is computed through the mapping relationship, and the position is the object position of the controlled virtual object. The observation point can be specifically a point at the foot sole of the controlled virtual object, or a point at the head of the controlled virtual object.

In the embodiment, the reference line segment is generated in the first direction relative to the object position; and in order to make a straight line formed by the skill indicator and the controlled virtual object parallel to a straight line formed by the specified position of the skill control and the current touch position, the reference line segment is generated in the first direction relative to the object position, that is, the reference line segment is parallel to the straight line formed by the specified position of the skill control and the current touch position.

In addition, in order to make the proportion of the movement distance of the current touch position to the movement distance of the skill indicator the same, the length of the reference line segment is matched with the farthest release position of the target skill in the virtual scene. When the skill control touches the farthest touch distance, the skill indicator can reach the farthest release distance in the virtual scene, therefore, when the length of the reference line segment is matched with the farthest release position of the target skill in the virtual scene, the length of the reference line segment is matched with the farthest touch distance of the skill control, and on the basis of that, the display position of the subsequent skill indicator can be matched with the current touch position of the skill control.

Step S306: Determine a target position in the reference line segment according to the current touch position, determine a target mapping position of the target position in the virtual scene, and control, at the target mapping position, the skill indicator which displays the target skill.

The current touch position can be the specified position, the maximum touch position of the skill control, or any position between the specified position and the maximum touch position; and moreover, the target position can be two end point positions of the reference line segment, and any position between the two end points. After the target position is determined, the target position should be set in the virtual scene, and the target mapping position is obtained and is the display position of the skill indicator.

The display control method for a skill indicator includes: in response to the touch operation for the skill control, acquiring the current touch position of the skill control, where the current touch position is located in the first direction relative to the specified position; on the plane of the scene picture, determining the object position of the controlled virtual object, and generating the reference line segment in the first direction relative to the object position, where the length of the reference line segment matches the farthest release position of the target skill in the virtual scene; and determining the target position in the reference line segment according to the current touch position, determining the target mapping position of the target position in the virtual scene, and controlling, at the target mapping position, the skill indicator which displays the target skill. In this way, on the plane of the scene picture, the reference line segment with the same direction as the current touch position is generated; the target position is determined from the reference line segment based on the current touch position, and then the target position is mapped to the virtual scene to obtain the display position of the skill indicator; because the reference line segment is in the same direction as the current touch position of the skill control, and the length of the reference line segment matches the farthest release position of the target skill, the display direction of the skill indicator is the same as the touch position of the skill control, and the movement direction of the skill indicator matches the touch position of the skill control; and therefore, the responsiveness when the player touches the skill control can be improved, such that the player can accurately control the release position of a skill, thereby improving the interaction experience of the game, reducing the running time of a terminal device, and saving on the electric quantity of the terminal device.

In some embodiments, for a game with a relatively fixed angle of view, the orientation angle of the virtual camera is not changed, for example, 45 degrees, but the position of the virtual camera can be changed. In the game with the relatively fixed angle of view, the display control method for a skill indicator according to the embodiment can be applied.

In the game with the changeable angle of view, for example, in a game scene with a 3D angle of view, the display control method for a skill indicator according to the embodiment can also be applied. Specifically, in response to the change in the orientation angle of the virtual camera, the scene picture is controlled to be changed; and when the orientation angle of the virtual camera is changed, the perspective angle of the virtual camera facing the virtual scene is changed along with the change in the orientation angle.

The display control method for a skill indicator according to the embodiment can be applied to the game scene with the 3D angle of view, that is, the orientation angle of the virtual camera can be manually adjusted through operation of the player, and can also be automatically adjusted according to the state change or scene change in the controlled virtual object. After the orientation angle of the virtual camera changes, the perspective angle of the virtual camera facing the virtual scene changes accordingly. The virtual camera can be abstracted into a visual cone in the virtual scene, and the vertex of the visual cone is the virtual camera; and the central axial direction of the visual cone is the orientation of the virtual camera. When the orientation angle of the virtual camera changes, the perspective angle of the virtual camera facing the virtual scene changes, the angle of the two-dimensional plane of the visual cone intercepted in the virtual scene changes, therefore, in the generated scene picture, the perspective relationship between the controlled virtual object and the game scene changes, and at the moment, the scene picture changes.

In the game scene, the orientation angle of the virtual camera can be controlled to change in multiple modes. Specifically, in response to the specified operation acting on the scene picture, or in response to the controlled virtual object executing a preset action, the orientation angle of the virtual camera is controlled to be changed. The specified operation acting on the scene picture can be, for example, a sliding operation for the scene picture, and when the player performs the sliding operation on the scene picture, the orientation angle of the virtual camera is controlled to be changed according to a sliding track of the sliding operation. In another mode, the orientation angle of the virtual camera can automatically change according to the controlled virtual object, for example, according to the position movement and posture change in the controlled virtual object, and specific skill release.

By means of the above way, in a game where the angle of view of a virtual camera is not fixed, or the angle of view of the virtual camera can be freely adjusted, the display direction of the skill indicator can still be the same as the touch position direction of the skill control on the scene picture corresponding to the current orientation of the virtual camera, and the movement position of the skill indicator is matched with the touch position of the skill control, so that the display control method for a skill indicator provided by the embodiment has a wide application scene and can be applied to game scenes under various angles of view.

In some embodiments, in response to a dragging operation acting on the skill control, the skill control is controlled to start to move from the specified position, and a movement position of the skill control is acquired; and the movement position is determined as the current touch position of the skill control. Specifically, in the initial state, the skill control is located at the specified position, the player presses the skill control at the specified position and slides the skill control on the screen in the press state, and then the dragging operation acting on the skill control can be achieved; and the skill control moves along with the position of the finger of the player on the screen, and at the moment, the movement position of the skill control, namely, the current touch position of the skill control, can be acquired in real time.

In some embodiments, a reference position is determined in the first direction relative to the object position; based on the reference position, the farthest release position in the virtual scene is determined, and the farthest mapping position of the farthest release position in the scene picture is determined; and based on the object position and the farthest mapping position, the reference line segment is generated.

The reference position can be a position point on the plane of the scene picture; a ray with the object position as an end point can be formed relative to a point in the first direction of the object position; a position point can be selected on the ray to serve as the reference position; and the distance between the reference position and the object position is not limited.

In an actual implementation, the reference position can be mapped into the virtual scene to indicate the first direction relative to the object position in the virtual scene, and then the farthest release position of the target skill is determined in the first direction in the virtual scene. The initial release position of the target skill is usually the position of the controlled virtual object in the virtual scene.

The farthest release position is a position in the virtual scene, and the farthest release position is mapped into the plane of the scene picture to obtain the farthest mapping position. The farthest mapping position is also located in the first direction relative to the object position, the object position and the farthest mapping position can form a straight line, and a part of line segment can be cut out on the straight line to obtain the reference line segment. Specifically, two end points of the reference line segment can be determined based on the object position and the farthest mapping position, and then the reference line segment is obtained.

In some embodiments, such as when the farthest release position is determined in the virtual scene, the reference mapping position of the reference position in the virtual scene is determined; in the virtual scene, a first straight line is generated based on the reference mapping position and the position of the controlled virtual object; and the farthest release position is determined along the first straight line.

Figure 5:
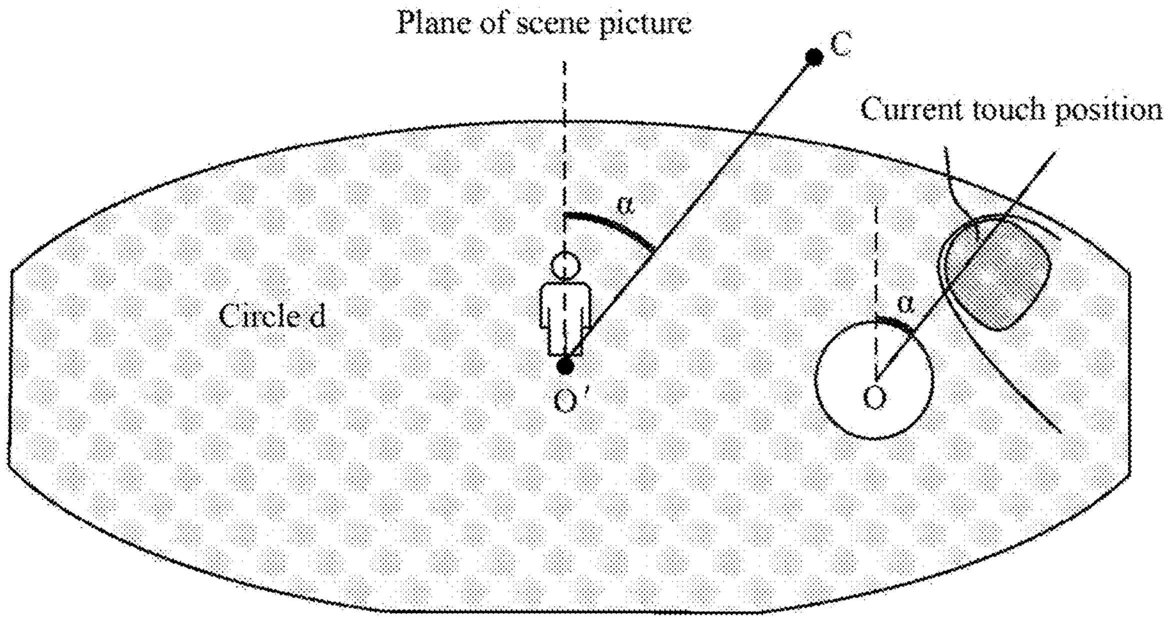
FIG. 5 is a schematic diagram of a reference position on a plane of a scene picture provided by one of embodiments of the present disclosure.

In order to facilitate understanding, FIG. 5 is taken as an example, the point O is the specified position, the current touch position is a finger position, the current touch position is in the first direction relative to the specified position, and an angle between the first direction and the vertical direction is a degrees. Similarly, on the plane of the scene picture, the point O' is an object position of the controlled virtual object, the point C is the reference position, and the reference position is in the first direction relative to the object position.

Figure 6:
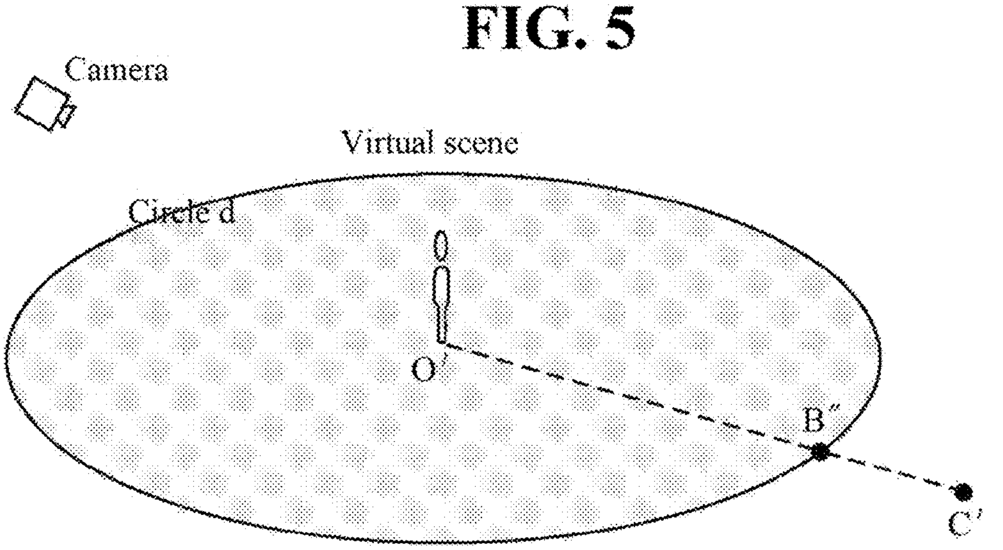
FIG. 6 is a schematic diagram of a reference mapping position and a farthest release position in a virtual scene provided by one of embodiments of the present disclosure.

FIG. 6 shows the reference mapping position of the reference position in the virtual scene, namely a point C', and the position of the controlled virtual object is the point O', and a straight line through which the point O' and the point C' pass is the first straight line.

When the farthest release position is determined along the first straight line, the release range of the target skill is determined based on the position of the controlled virtual object in the virtual scene; and an intersection point of the first straight line and a range edge line of the release range is determined, and the intersection point is determined as the farthest release position.

Figure 7:
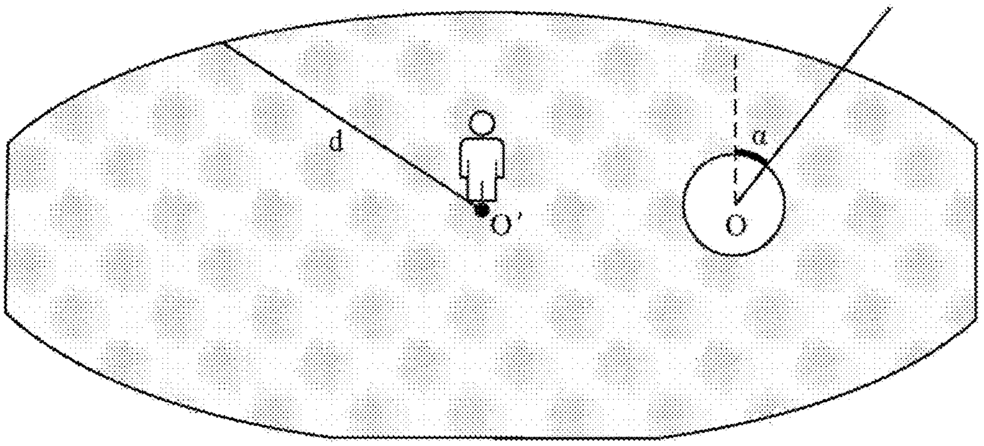
FIG. 7 is a schematic diagram of a release range of a target skill in a virtual scene provided by one of embodiments of the present disclosure.

As shown in FIG. 7, in the virtual scene, the position of the controlled virtual object is the point O', the maximum release distance of the target skill is d, at the moment, a circle with the radius being d is generated in the virtual scene with the point O' as the circle center, and the circle represents the release range of the target skill. The edge of the circle is the range edge line of the release range.

As shown in FIG. 6, the straight line that the point O' and the point C' pass through, namely, the first straight line, intersects with the range edge line of the release range, the intersection point is B", and the point B" is the farthest release position of the target skill in the first direction relative to the object position.

In some embodiments, the reference line segment is generated between the object position and the farthest mapping position; and two end positions of the reference line segment are respectively the object position and the farthest mapping position.

Figure 8:
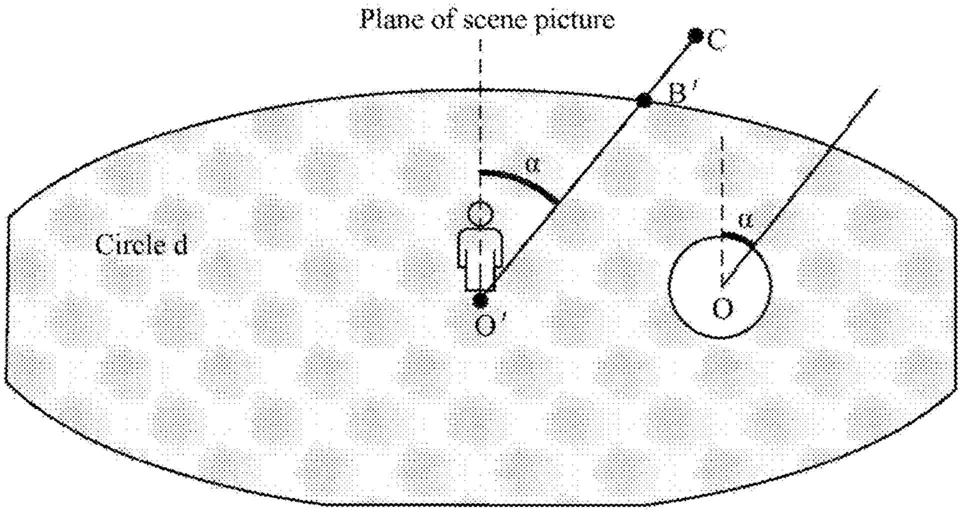
FIG. 8 is a schematic diagram of a farthest mapping position and a reference line segment on a plane of a scene picture provided by one of embodiments of the present disclosure.

As shown in FIG. 8, the point B' is the farthest mapping position on the plane of the scene picture, the point O' is the object position, the point O' and the point B' are two end points of the reference line segment, and the line segment between the point O' and the point B' is the reference line segment.

When the target position is determined in the reference line segment, In some embodiments, the farthest touch position of the skill control is determined on the plane of the scene picture; the farthest touch position includes: a touch position for controlling the target skill to be released to the farthest release position; the farthest touch position is located in the first direction relative to the specified position; a first distance relationship among the current touch position, the specified position and the farthest touch position is determined; the target position is determined in the reference line segment based on the first distance relationship; and the target position and the two end positions of the reference line segment meet the first distance relationship.

After the skill control is subjected to the touch operation, the first direction can be determined according to the current touch position, and the farthest touch position of the skill control can be determined in the first direction. Generally, the distance between the farthest touch position and the specified position of the skill control can be preset according to operation requirements. If the skill control is released at the farthest touch position, the target skill can be released to the farthest release position relative to the object position. The farthest release position is located in the first direction relative to the object position.

Generally, the current touch position is located between the specified position and the farthest touch position, and can also be located at the specified position or the farthest touch position. The first distance relationship can be used for indicating the distance relationship between the current touch position and the specified position and the distance relationship between the current touch position and the farthest touch position. Based on the first distance relationship, the target position can be determined in the reference line segment, and the distance relationship between the target position and the first end point of the reference position and the distance relationship between the target position and the second end point of the reference position are the first distance relationship.

In some embodiments, the first distance relationship includes that: the distance ratio of a first distance between the specified position and the current touch position to a second distance between the current touch position and the farthest touch position is a first ratio; the two end positions of the reference line segment includes: the object position and the farthest mapping position of the farthest release position in the scene picture; and the target position is determined in the reference line segment, so that the distance ratio of a third distance between the object position and the target position to a fourth distance between the target position and the farthest mapping position is the first ratio.

Figure 9:
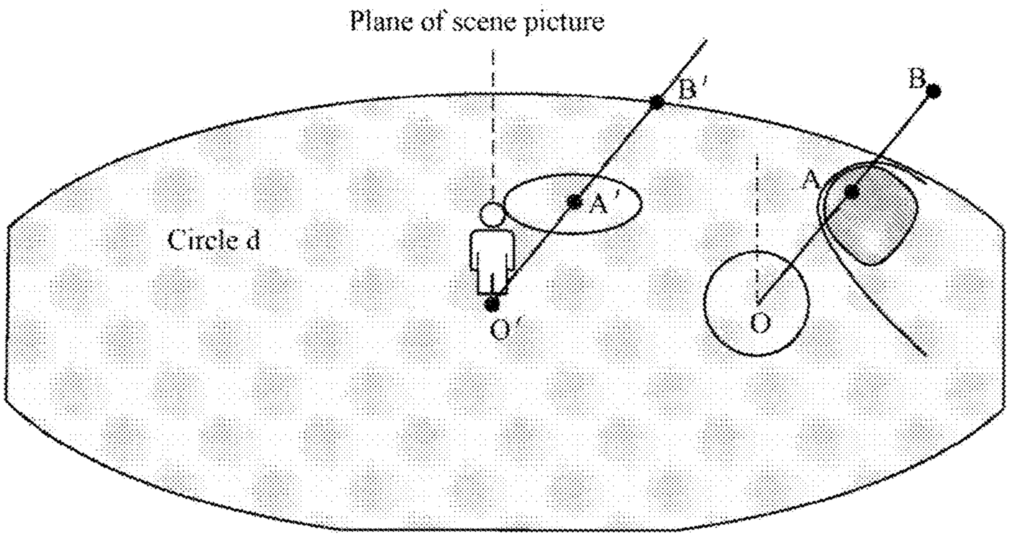
FIG. 9 is a schematic diagram of determining a target position in a reference line segment provided by one of embodiments of the present disclosure.

In order to facilitate understanding, FIG. 9 is taken as an example, the point O is the specified position of the skill control, the point A is the current touch position, and the point B is the farthest touch position; and the point O' is the object position of the controlled virtual object, the point B' is the farthest mapping position, and the point A' is the target position; and the points in the FIG. 9 are the points on the plane of the scene picture. The first distance between the specified position and the current touch position represents the length of a line segment OA, the second distance between the current touch position and the farthest touch position represents the length of a line segment AB, and the ratio of the first distance to the second distance, namely the first ratio, is OA/OB. The third distance between the object position and the target position represents the length of a line segment O' A', the fourth distance between the target position and the farthest mapping position represents the length of a line segment A' B', and the ratio of the third distance to the fourth distance is O' A'/A' B', and it is also the first ratio, namely OA/OB=O' A'/A' B'.

Figure 10:
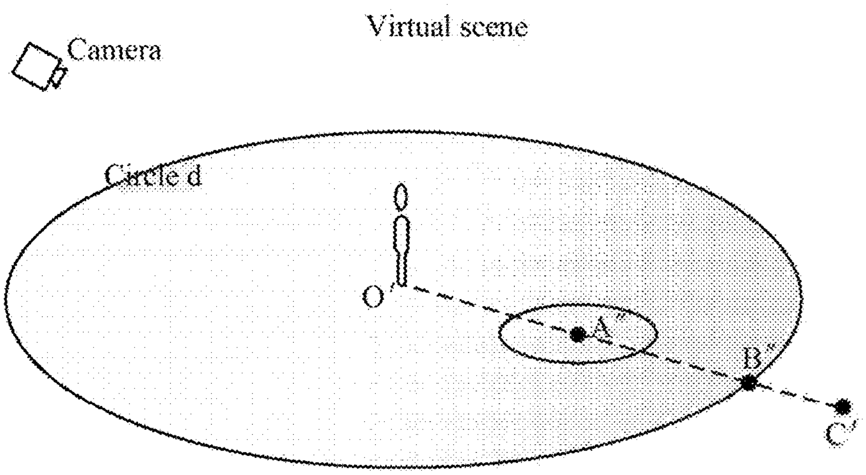
FIG. 10 is a schematic diagram of a target mapping position in a virtual scene provided by one of embodiments of the present disclosure.

As shown in FIG. 10, the target position point A" is mapped into the virtual scene to obtain a target mapping position point A', the target mapping position point A' is also located in the first direction relative to the object position point O', and the skill indicator is displayed on the target mapping position point A".

It is to be noted that because the current touch position of the skill control may change in real time, the obtained target mapping position gradually changes after the current touch position is processed in the abovementioned embodiment; the direction, relative to the object position, of the skill indicator obtained in this mode is the same as the direction, relative to the specified position, of the current touch position, that is, the direction of the skill indicator is the same as the dragging direction of the skill control, and the movement distance of the skill indicator is consistent with the movement distance of the skill control in proportion.

Further, in response to the touch release operation for the skill control at the current touch position, the target skill is controlled to be released to the target mapping position. Because the target skill usually has a certain attack range, the skill indication control is displayed at the target mapping position in a certain shape, such as a circle, and the circle is the target mapping position. After the target skill is released to the target mapping position, the target skill is released at the target mapping position and the surrounding area.

According to the display control method for a skill indicator, in the game scene that the angle of view of the camera is not fixed and can be freely adjusted, a solution for correcting the orientation and displacement of the skill indicator is provided; a skill indicator, which is generated on the horizontal plane in the three-dimensional space of the virtual scene under the 3D angle of view according to the current real-time camera data, is parallel to the dragging angle of the skill control under the view of the camera, and equal to the proportion of the dragging distance of the skill control, is realized, that is, the orientation of the skill indicator and the direction of the finger drag are parallel in the plane view, and the dragging distance is proportional to the indicator displacement distance. Therefore, the responsiveness when the player touches the skill control can be improved, such that the player can accurately control the release position of the skill, thereby improving the interaction experience of the game, reducing the running time of the terminal device, and saving on the electric quantity of the terminal device.

Figure 11:
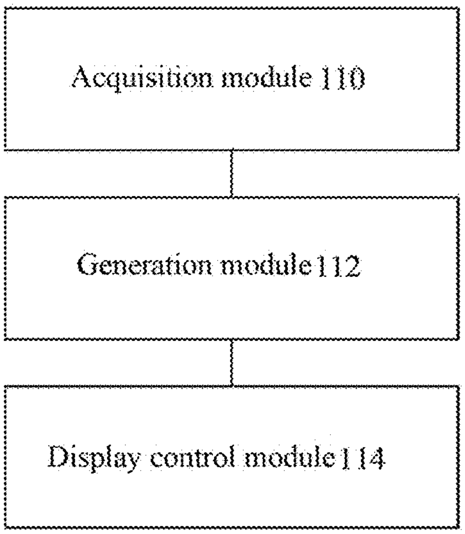
FIG. 11 is a structural schematic diagram of a display control apparatus for a skill indicator provided by one of embodiments of the present disclosure.

FIG. 11 is a structural schematic diagram of a display control apparatus for a skill indicator; a graphical user interface is provided by a terminal device; the graphical user interface displays a skill control and a scene picture that is shot by a virtual camera in a game in a virtual scene; the skill control is displayed at a specified position on the graphical user interface and is configured to release a target skill; the virtual scene includes a controlled virtual object that is controlled through the terminal device; the apparatus includes:

an acquisition module 110 which is configured to: in response to a touch operation for the skill control, acquire the current touch position of the skill control, where the current touch position is located in a first direction relative to a specified position;

a generation module 112 which is configured to: on the plane of the scene picture, determine an object position of the controlled virtual object, and generate a reference line segment in the first direction relative to the object position, where the length of the reference line segment matches a farthest release position of the target skill in the virtual scene; and a display control module 114 which is configured to determine a target position in the reference line segment according to the current touch position, determine a target mapping position of the target position in the virtual scene, and control, at the target mapping position, the skill indicator which displays the target skill.

The display control apparatus for a skill indicator is configured to: in response to the touch operation for the skill control, acquire the current touch position of the skill control, where the current touch position is located in the first direction relative to the specified position; on the plane of the scene picture, determine the object position of the controlled virtual object, and generate the reference line segment in the first direction relative to the object position, where the length of the reference line segment matches the farthest release position of the target skill in the virtual scene; and determine the target position in the reference line segment according to the current touch position, determine the target mapping position of the target position in the virtual scene, and control, at the target mapping position, the skill indicator which displays the target skill. In this way, on the plane of the scene picture, the reference line segment with the same direction as the current touch position is generated; the target position is determined from the reference line segment based on the current touch position, and then the target position is mapped to the virtual scene to obtain the display position of the skill indicator; because the reference line segment is in the same direction as the current touch position of the skill control, and the length of the reference line segment matches the farthest release position of the target skill, the display direction of the skill indicator is the same as the touch position of the skill control, and the movement direction of the skill indicator matches the touch position of the skill control; and therefore, the responsiveness when the player touches the skill control can be improved, such that the player can accurately control the release position of a skill, thereby improving the interaction experience of the game, reducing the running time of a terminal device, and saving on the electric quantity of the terminal device.

The apparatus further includes a scene control module which is configured to: in response to the change in the orientation angle of the virtual camera, control the scene picture to change; and when the orientation angle of the virtual camera is changed, the perspective angle of the virtual camera facing the virtual scene is changed along with the change in the orientation angle.

The apparatus further includes an orientation control module which is configured to: in response to the specified operation acting on the scene picture, or in response to the controlled virtual object executing a preset action, control the orientation angle of the virtual camera to change.

The acquisition module is further configured to: in response to a dragging operation acting on the skill control, control the skill control to start to move from the specified position, and acquire a movement position of the skill control; and determine the movement position as the current touch position of the skill control.

The generation module is further configured to: determine the reference position in the first direction relative to an object position; based on the reference position, determine the farthest release position in the virtual scene, and determine the farthest mapping position of the farthest release position in the scene picture; and generate the reference line segment based on the object position and the farthest mapping position.

The generation module is further configured to: determine a reference mapping position of a reference position mapped in the virtual scene; generate a first straight line in the virtual scene based on the reference mapping position and the position of the controlled virtual object; and determine the farthest release position along the first straight line.

The generation module is further configured to: determine a release range of the target skill based on the position of the controlled virtual object in the virtual scene; and determine an intersection point of the first straight line and a range edge line of the release range, and determine the intersection point as the farthest release position.

The generation module is further configured to: generate the reference line segment between the object position and the farthest mapping position; and two end positions of the reference line segment are respectively the object position and the farthest mapping position.

The display control module is further configured to: determine the farthest touch position of the skill control on the plane of the scene picture, in which the farthest touch position includes: a touch position for controlling the target skill to be released to the farthest release position, and the farthest touch position is located in the first direction relative to the specified position; determine a first distance relationship among the current touch position, the specified position and the farthest touch position; and determine the target position in the reference line segment based on the first distance relationship; and the target position and the two end positions of the reference line segment meet the first distance relationship.

The first distance relationship includes that: the distance ratio of a first distance between the specified position and the current touch position to a second distance between the current touch position and the farthest touch position is a first ratio; the two end positions of the reference line segment includes: the object position and the farthest mapping position of the farthest release position in the scene picture; and the display control module is further configured to: determine the target position in the reference line segment, so that the distance ratio of a third distance between the object position and the target position to a fourth distance between the target position and the farthest mapping position is the first ratio.

The apparatus further includes: a skill release module which is configured to: in response to a touch release operation for the skill control at the current touch position, control the target skill to be released to the target mapping position.

In some embodiments, an electronic device is further provided, the electronic device includes a processor and a memory that stores machine-executable instructions executable by the processor, and the processor executes the machine-executable instructions to realize the above display control method for a skill indicator. The electronic device can be a server or a touch terminal device.

Figure 12:
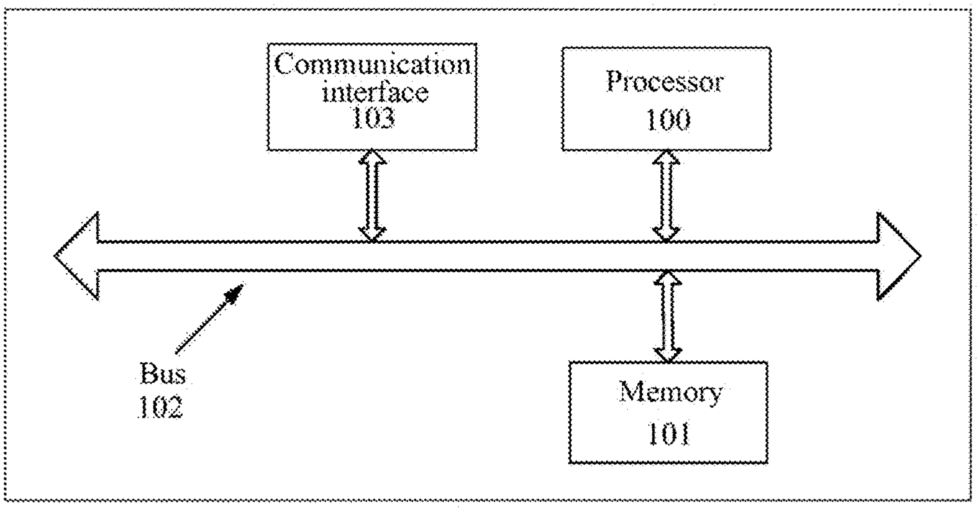
FIG. 12 is a schematic diagram of an electronic device provided by one of the embodiments of the present disclosure.

As shown in FIG. 12, the electronic device includes a processor 100 and a memory 101, the memory 101 stores machine-executable instructions executable by the processor 100, and the processor 100 executes machine-executable instructions to realize the above display control method for a skill indicator.

Further, the electronic device shown in FIG. 12 further includes a bus 102 and a communication interface 103; and the processor 100, the communication interface 103 and the memory 101 are connected through the bus 102.

The Memory 101 may include a Random Access Memory (RAM), and may also include a non-volatile memory, such as at least one disk memory. Communication connection between a system network element and at least one other network element is realized through at least one communication interface 103 (which can be wired or wireless), and the Internet, a wide area network, a local network, a metropolitan area network and the like can be used. The bus 102 can be an ISA bus, a PCI bus, an EISA bus or the like. The buses can be divided into an address bus, a data bus, a control bus and the like. In order to facilitate representation, only one bidirectional arrow is used for representation in FIG. 12, but it does not indicate that there is only one bus or one type of bus.

The processor 100 may be an integrated circuit chip and has the signal processing capacity. In the implementation process, all steps of the method can be implemented through an integrated logic circuit of hardware in the processor 100 or an instruction in a software form. The processor 100 can be a universal processor, including a Central Processing Unit (CPU), a Network Processor (NP) and the like; it can also be a Digital Signal Processor (DSP), an Application Specific Integrated Circuit (ASIC), a Field-Programmable Gate Array (FPGA) or other Programmable logic devices, discrete gates or transistor logic devices and discrete hardware assemblies. All the methods, steps and logic block diagrams disclosed in the embodiment can be implemented or executed. The universal processor can be a microprocessor or the processor can also be any conventional processor and the like. The steps combined with the method disclosed in the embodiment can be directly embodied in execution completion of a hardware decoding processor or execution completion of combination of hardware and software modules in the decoding processor. The software modules can be located in a random access memory, a flash memory, a read-only memory, a programmable read-only memory or an electrically erasable programmable memory, a register and other mature storage media in the field. The storage media are located in a memory 101, the processor 100 reads information in the memory 101; and the steps of the method in the embodiment are completed in combination with the hardware.

The processor in the electronic device can perform the following operations in the display control method for a skill indicator by executing the machine-executable instructions:

the graphical user interface is provided by the terminal device; the graphical user interface displays the skill control and the scene picture of the virtual scene; the skill control is displayed at the specified position on the graphical user interface and is configured to release the target skill; the virtual scene includes the controlled virtual object in the virtual scene; the operation includes: in response to the touch operation for the skill control, acquiring the current touch position of the skill control, where the current touch position is located in the first direction relative to the specified position; on the plane of the scene picture, determining the object position of the controlled virtual object, and generating the reference line segment in the first direction relative to the object position, where the length of the reference line segment matches the farthest release position of the target skill in the virtual scene; and determining the target position in the reference line segment according to the current touch position, determining the target mapping position of the target position in the virtual scene, and controlling, at the target mapping position, the skill indicator which displays the target skill.

In this way, on the plane of the scene picture, the reference line segment with the same direction as the current touch position is generated; the target position is determined from the reference line segment based on the current touch position, and then the target position is mapped to the virtual scene to obtain the display position of the skill indicator; because the reference line segment is in the same direction as the current touch position of the skill control, and the length of the reference line segment matches the farthest release position of the target skill, the display direction of the skill indicator is the same as the touch position of the skill control, and the movement direction of the skill indicator matches the touch position of the skill control; and therefore, the responsiveness when the player touches the skill control can be improved, such that the player can accurately control the release position of a skill, thereby improving the interaction experience of the game, reducing the running time of a terminal device, and saving on the electric quantity of the terminal device.

In response to the change in the orientation angle of the virtual camera, the scene picture is controlled to be changed; and when the orientation angle of the virtual camera is changed, the perspective angle of the virtual camera facing the virtual scene is changed along with the change in the orientation angle.

In response to the specified operation acting on the scene picture, or in response to the controlled virtual object executing the preset action, the orientation angle of the virtual camera is controlled to be changed.

In response to the dragging operation acting on the skill control, the skill control is controlled to start to move from the specified position, and the movement position of the skill control is acquired; and the movement position is determined as the current touch position of the skill control.

The reference position is determined in the first direction relative to the object position; based on the reference position, the farthest release position in the virtual scene is determined, and the farthest mapping position of the farthest release position in the scene picture is determined; and based on the object position and the farthest mapping position, the reference line segment is generated.

The reference mapping position of the reference position in the virtual scene is determined; in the virtual scene, the first straight line is generated based on the reference mapping position and the position of the controlled virtual object; and the farthest release position is determined along the first straight line.

The release range of the target skill is determined based on the position of the controlled virtual object in the virtual scene; and the intersection point of the first straight line and the range edge line of the release range is determined, and the intersection point is determined as the farthest release position.

The reference line segment is generated between the object position and the farthest mapping position; and the two end positions of the reference line segment are respectively the object position and the farthest mapping position.

The farthest touch position of the skill control is determined on the plane of the scene picture; the farthest touch position includes: the touch position for controlling the target skill to be released to the farthest release position; the farthest touch position is located in the first direction relative to the specified position; a first distance relationship among the current touch position, the specified position and the farthest touch position is determined; the target position is determined in the reference line segment based on the first distance relationship; and the target position and the two end positions of the reference line segment meet the first distance relationship.

The first distance relationship includes that: the distance ratio of a first distance between the specified position and the current touch position to a second distance between the current touch position and the farthest touch position is the first ratio; the two end positions of the reference line segment include: the object position and the farthest mapping position of the farthest release position in the scene picture; and the target position is determined in the reference line segment, so that the distance ratio of a third distance between the object position and the target position to a fourth distance between the target position and the farthest mapping position is the first ratio.

In response to a touch release operation for the skill control at the current touch position, the target skill is controlled to be released to the target mapping position.

According to the display control method for a skill indicator, in the game scene that the angle of view of the camera is not fixed and can be freely adjusted, a solution for correcting the orientation and displacement of the skill indicator is provided; a skill indicator, which is generated on the horizontal plane in the three-dimensional space of the virtual scene under the 3D angle of view according to the current real-time camera data, is parallel to the dragging angle of the skill control under the view of the camera, and equal to the proportion of the dragging distance of the skill control, is realized, that is, the orientation of the skill indicator and the direction of the finger drag are parallel in the plane view, and the dragging distance is proportional to the indicator displacement distance. Therefore, the responsiveness when the player touches the skill control can be improved, such that the player can accurately control the release position of the skill, thereby improving the interaction experience of the game, reducing the running time of the terminal device, and saving on the electric quantity of the terminal device.

In some embodiments, a machine-readable storage medium is further provided, the machine-readable storage medium stores machine-executable instructions, and when the machine-executable instructions are invoked and executed by a processor, the machine-executable instructions cause the processor to realize the above display control method for a skill indicator.

The machine-readable storage medium stores machine-executable instructions, and when the machine-executable instructions are executed, the following operations in the display control method for a skill indicator can be implemented:

the graphical user interface is provided by the terminal device; the graphical user interface displays the skill control and the scene picture of the virtual scene; the skill control is displayed at the specified position on the graphical user interface and is configured to release the target skill; the virtual scene includes the controlled virtual object in the virtual scene; the operation includes: in response to the touch operation for the skill control, acquiring the current touch position of the skill control, where the current touch position is located in the first direction relative to the specified position; on the plane of the scene picture, determining the object position of the controlled virtual object, and generating the reference line segment in the first direction relative to the object position, where the length of the reference line segment matches the farthest release position of the target skill in the virtual scene; and determining the target position in the reference line segment according to the current touch position, determining the target mapping position of the target position in the virtual scene, and controlling, at the target mapping position, the skill indicator which displays the target skill.

In this way, on the plane of the scene picture, the reference line segment with the same direction as the current touch position is generated; the target position is determined from the reference line segment based on the current touch position, and then the target position is mapped to the virtual scene to obtain the display position of the skill indicator; because the reference line segment is in the same direction as the current touch position of the skill control, and the length of the reference line segment matches the farthest release position of the target skill, the display direction of the skill indicator is the same as the touch position of the skill control, and the movement direction of the skill indicator matches the touch position of the skill control; and therefore, the responsiveness when the player touches the skill control can be improved, such that the player can accurately control the release position of a skill, thereby improving the interaction experience of the game, reducing the running time of a terminal device, and saving on the electric quantity of the terminal device.

In response to the change in the orientation angle of the virtual camera, the scene picture is controlled to be changed; and when the orientation angle of the virtual camera is changed, the perspective angle of the virtual camera facing the virtual scene is changed along with the change in the orientation angle.

In response to the specified operation acting on the scene picture, or in response to the controlled virtual object executing the preset action, the orientation angle of the virtual camera is controlled to be changed.

In response to the dragging operation acting on the skill control, the skill control is controlled to start to move from the specified position, and the movement position of the skill control is acquired; and the movement position is determined as the current touch position of the skill control.

The reference position is determined in the first direction relative to the object position; based on the reference position, the farthest release position in the virtual scene is determined, and the farthest mapping position of the farthest release position in the scene picture is determined; and based on the object position and the farthest mapping position, the reference line segment is generated.

The reference mapping position of the reference position in the virtual scene is determined; in the virtual scene, the first straight line is generated based on the reference mapping position and the position of the controlled virtual object; and the farthest release position is determined along the first straight line.

The release range of the target skill is determined based on the position of the controlled virtual object in the virtual scene; and the intersection point of the first straight line and the range edge line of the release range is determined, and the intersection point is determined as the farthest release position.

The reference line segment is generated between the object position and the farthest mapping position; and the two end positions of the reference line segment are respectively the object position and the farthest mapping position.

The farthest touch position of the skill control is determined on the plane of the scene picture; the farthest touch position includes: the touch position for controlling the target skill to be released to the farthest release position; the farthest touch position is located in the first direction relative to the specified position; a first distance relationship among the current touch position, the specified position and the farthest touch position is determined; the target position is determined in the reference line segment based on the first distance relationship; and the target position and the two end positions of the reference line segment meet the first distance relationship.

The first distance relationship includes that: the distance ratio of a first distance between the specified position and the current touch position to a second distance between the current touch position and the farthest touch position is the first ratio; the two end positions of the reference line segment include: the object position and the farthest mapping position of the farthest release position in the scene picture; and the target position is determined in the reference line segment, so that the distance ratio of a third distance between the object position and the target position to a fourth distance between the target position and the farthest mapping position is the first ratio.

In response to a touch release operation for the skill control at the current touch position, the target skill is controlled to be released to the target mapping position.

According to the display control method for a skill indicator, in the game scene that the angle of view of the camera is not fixed and can be freely adjusted, a solution for correcting the orientation and displacement of the skill indicator is provided; a skill indicator, which is generated on the horizontal plane in the three-dimensional space of the virtual scene under the 3D angle of view according to the current real-time camera data, is parallel to the dragging angle of the skill control under the view of the camera, and equal to the proportion of the dragging distance of the skill control, is realized, that is, the orientation of the skill indicator and the direction of the finger drag are parallel in the plane view, and the dragging distance is proportional to the indicator displacement distance. Therefore, the responsiveness when the player touches the skill control can be improved, such that the player can accurately control the release position of the skill, thereby improving the interaction experience of the game, reducing the running time of the terminal device, and saving on the electric quantity of the terminal device.

The display control method and apparatus for a skill indicator, and the electronic device provided by the embodiments of the disclosure include a computer-readable storage medium which stores program codes, and instructions included in the program codes can be used for executing the method in the embodiments of the method; and the specific implementation may be referred to the embodiments of the method, and will not be listed herein.

Those skilled in the art can clearly understand that for the convenience and simplicity of description, the specific working processes of the above-described systems and apparatuses can be referred to the corresponding process in the foregoing method embodiments, and will not be described again herein.

Moreover, in the description of the present disclosure, unless otherwise specified and limited, the terms "mounting", "linking", and "connection" are to be broadly understood, for example, the connection can be fixed connection, detachable connection, or integrated connection; and the connection can be mechanical connection, or electrical connection; the linking can be direct linking, or indirect linking through an intermediate medium, or internal communication of two components. For those skilled in the art, the specific meanings of the above terms in the present disclosure can be understood in specific circumstances.

If the function is implemented in a software function unit mode and is sold or used as an independent product, it can be stored in a computer-readable storage medium. Based on this understanding, the essence of the disclosed technical solution or the part that contributes to the related technology or the part of the technical solution may be embodied in the form of a software product, and the computer software product is stored in the storage medium and includes a plurality of instructions used for enabling one computer device (which can be a personal computer, a server or network equipment and the like) to execute all or part of the steps of the method of all the embodiments of present disclosure. The storage medium includes a USB flash disk, a mobile hard disk, a Read-Only Memory (ROM), a Random Access Memory (RAM), a disk or an optical disk and other media capable of storing program codes.

In the description of the present disclosure, it is to be noted that the terms "center", "up", "down", "left", "right", "vertical", "horizontal", "inner", "outer", etc., indicate the orientation or positional relationship based on the orientation or positional relationship shown in the drawing, and are only for the convenience of description of the present disclosure and for the purpose of simplifying the description, and do not indicate or imply that the device or element referred to must have a specific orientation, be constructed and operated in a particular orientation, and therefore cannot be construed as limiting the present disclosure. In addition, the terms "first", "second", "third" are used for descriptive purposes only and should not be construed as indicating or implying relative importance.

Finally, it is to be noted that the above-mentioned embodiments are only specific embodiments of the present disclosure, which are used for illustrating the technical solutions of the present disclosure, not to limit them, and the scope of protection of the present disclosure is not limited to this, although the present disclosure is described in detail with reference to the above embodiments, those skilled in the art should understand that any person skilled in the art who is familiar with the art can still modify the technical solutions described in the aforesaid embodiments or can easily think of changes within the scope of the technology disclosed in the disclosure, or the equivalent substitution of some of the technical features; however, these modifications, changes or substitutions do not depart from the essence of the corresponding technical solution from the spirit and scope of the technical solution of the embodiments of the present disclosure, and shall be covered by the scope of protection of the present disclosure. Therefore, the scope of protection of the present disclosure shall be described in accordance with the scope of protection of the claims.

The invention claimed is:

1. A display control method for a skill indicator, the method comprises:

in response to a touch operation for a skill control, acquiring a touch position of the skill control, wherein a graphical user interface is provided by a terminal device, the graphical user interface displays the skill control and a scene picture that is shot by a virtual camera in a virtual scene, the skill control is displayed at a specified position on the graphical user interface and is configured to release a target skill, the virtual scene comprises a controlled virtual object that is controlled through the terminal device, and the touch position is located in a first direction relative to the specified position;

on a plane of the scene picture, determining an object position of the controlled virtual object;

generating a reference line segment in the first direction relative to the object position, wherein the reference line segment reaches a farthest release position of the target skill in the virtual scene;

determining a target position in the reference line segment according to the touch position;

determining a target mapping position in the virtual scene using the target position; and controlling, at the target mapping position, a display of the skill indicator for the target skill.

2. The method according to claim 1, wherein before acquiring, in response to the touch operation for the skill control, the touch position of the skill control, the method further comprises:

in response to a change in an orientation angle of the virtual camera, controlling the scene picture to change, wherein a perspective view angle of the virtual camera facing the virtual scene is changed along with the change in the orientation angle of the virtual camera.

3. The method according to claim 2, wherein before controlling, in response to the change in the orientation angle of the virtual camera, the scene picture to change, the method further comprises:

in response to a specified operation acting on the scene picture, or in response to the controlled virtual object executing a preset action, controlling the orientation angle of the virtual camera to change.

4. The method according to claim 1, wherein acquiring, in response to the touch operation for the skill control, the touch position of the skill control comprises:

in response to a dragging operation acting on the skill control, controlling the skill control to move from the specified position to acquire a movement position of the skill control; and determining the movement position as the touch position of the skill control.

5. The method according to claim 1, wherein generating the reference line segment in the first direction relative to the object position comprises:

determining a reference position in the first direction relative to the object position;

based on the reference position, determining the farthest release position in the virtual scene;

determining a farthest mapping position in the scene picture using the farthest release position; and generating the reference line segment based on the object position and the farthest mapping position.

6. The method according to claim 5, wherein determining, based on the reference position, the farthest release position in the virtual scene comprises:

determining a reference mapping position in the virtual scene using the reference position;

generating a first straight line in the virtual scene based on the reference mapping position and the object position of the controlled virtual object; and determining the farthest release position along the first straight line.

7. The method according to claim 6, wherein determining the farthest release position along the first straight line comprises:

determining a release range of the target skill based on the object position of the controlled virtual object in the virtual scene;

determining an intersection point of the first straight line and a range edge line of the release range; and determining the intersection point as the farthest release position.

8. The method according to claim 5, wherein generating the reference line segment based on the object position and the farthest mapping position comprises:

generating the reference line segment between the object position and the farthest mapping position, wherein a first end position of the reference line segment corresponds to the object position, and a second end position of the reference line segment corresponds to the farthest mapping position.

9. The method according to claim 1, wherein determining the target position in the reference line segment according to the touch position comprises:

determining a farthest touch position of the skill control on the plane of the scene picture, wherein the farthest touch position comprises a touch position for controlling the target skill to be released to the farthest release position, and the farthest touch position is located in the first direction relative to the specified position;

determining a first distance relationship among the current touch position, the specified position, and the farthest touch position; and determining the target position in the reference line segment based on the first distance relationship, wherein the target position and two end positions of the reference line segment meet the first distance relationship.

10. The method according to claim 9, wherein the first distance relationship comprises a first distance ratio between a first distance and a second distance, the first distance comprises a distance between the specified position and the touch position, and the second distance comprises a distance between the touch position and the farthest touch position, the two end positions of the reference line segment comprise the object position and a farthest mapping position in the scene picture using the farthest release position, and determining the target position in the reference line segment based on the first distance relationship comprises:

determining the target position in the reference line segment to make a second distance ratio between a third distance and a fourth distance aligns with the first distance ratio, wherein the third distance comprises a distance between the object position and the target position, and the fourth distance comprises a distance between the target position and the farthest mapping position.

11. The method according to claim 1, wherein after controlling, at the target mapping position, the display of the skill indicator for the target skill, the method further comprises:

in response to a touch release operation for the skill control at the touch position, controlling the target skill to be released to the target mapping position.

12. A system, comprising:

one or more memories collectively containing one or more programs; and one or more processors, wherein the one or more processors are configured to, individually or collectively, perform an operation comprising:

in response to a touch operation for a skill control, acquiring a touch position of the skill control, wherein a graphical user interface is provided by a terminal device, the graphical user interface displays the skill control and a scene picture that is shot by a virtual camera in a virtual scene, the skill control is displayed at a specified position on the graphical user interface and is configured to release a target skill, the virtual scene comprises a controlled virtual object that is controlled through the terminal device, and the touch position is located in a first direction relative to the specified position;

on a plane of the scene picture, determining an object position of the controlled virtual object;

generating a reference line segment in the first direction relative to the object position, wherein the reference line segment reaches a farthest release position of the target skill in the virtual scene;

determining a target position in the reference line segment according to the touch position;

determining a target mapping position in the virtual scene using the target position; and controlling, at the target mapping position, a display of a skill indicator for the target skill.

13. The system according to claim 12, wherein before acquiring, in response to the touch operation for the skill control, the touch position of the skill control, the operation further comprises:

in response to a change in an orientation angle of the virtual camera, controlling the scene picture to change, wherein a perspective view angle of the virtual camera facing the virtual scene is changed along with the change in the orientation angle of the virtual camera.

14. The system according to claim 13, wherein before controlling, in response to the change in the orientation angle of the virtual camera, the scene picture to change, the operation further comprises:

in response to a specified operation acting on the scene picture, or in response to the controlled virtual object executing a preset action, controlling the orientation angle of the virtual camera to change.

15. The system according to claim 12, wherein acquiring, in response to the touch operation for the skill control, the touch position of the skill control comprises:

in response to a dragging operation acting on the skill control, controlling the skill control to move from the specified position to acquire a movement position of the skill control; and determining the movement position as the touch position of the skill control.

16. The system according to claim 12, wherein generating the reference line segment in the first direction relative to the object position comprises:

determining a reference position in the first direction relative to the object position;

based on the reference position, determining the farthest release position in the virtual scene;

determining a farthest mapping position in the scene picture using the farthest release position; and generating the reference line segment based on the object position and the farthest mapping position.

17. The system according to claim 16, wherein determining, based on the reference position, the farthest release position in the virtual scene comprises:

determining a reference mapping position in the virtual scene using the reference position;

generating a first straight line in the virtual scene based on the reference mapping position and the object position of the controlled virtual object; and determining the farthest release position along the first straight line.

18. The system according to claim 12, wherein determining the target position in the reference line segment according to the touch position comprises:

determining a farthest touch position of the skill control on the plane of the scene picture, wherein the farthest touch position comprises a touch position for controlling the target skill to be released to the farthest release position, and the farthest touch position is located in the first direction relative to the specified position;

determining a first distance relationship among the touch position, the specified position, and the farthest touch position; and determining the target position in the reference line segment based on the first distance relationship, wherein the target position and two end positions of the reference line segment meet the first distance relationship.

19. The system according to claim 12, wherein after controlling, at the target mapping position, the display of the skill indicator for the target skill, the operation further comprises:

in response to a touch release operation for the skill control at the touch position, controlling the target skill to be released to the target mapping position.

20. One or more non-transitory computer-readable storage media containing, in any combination, computer program code that, when executable by a computer system, perform an operation comprising:

in response to a touch operation for a skill control, acquiring a touch position of the skill control, wherein a graphical user interface is provided by a terminal device, the graphical user interface displays the skill control and a scene picture that is shot by a virtual camera in a virtual scene, the skill control is displayed at a specified position on the graphical user interface and is configured to release a target skill, the virtual scene comprises a controlled virtual object that is controlled through the terminal device, and the touch position is located in a first direction relative to the specified position;

on a plane of the scene picture, determining an object position of the controlled virtual object;

generating a reference line segment in the first direction relative to the object position, wherein the reference line segment reaches a farthest release position of the target skill in the virtual scene;

determining a target position in the reference line segment according to the touch position;

determining a target mapping position in the virtual scene using the target position; and controlling, at the target mapping position, a display of a skill indicator for the target skill.

* * * * *